United States Patent
Hagadorn et al.

(10) Patent No.: US 9,249,238 B2
(45) Date of Patent: Feb. 2, 2016

(54) REVERSIBLE CHAIN-TRANSFER IN POLYOLEFIN POLYMERIZATION WITH PYRIDYLDIAMIDE CATALYSTS

(71) Applicant: ExxonMobil Chemical Patents Inc., Baytown, TX (US)

(72) Inventors: John R. Hagadorn, Houston, TX (US); Jian Yang, Houston, TX (US); Patrick J. Palafox, Seabrook, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 14/195,634

(22) Filed: Mar. 3, 2014

(65) Prior Publication Data
US 2014/0256893 A1    Sep. 11, 2014

Related U.S. Application Data

(60) Provisional application No. 61/773,486, filed on Mar. 6, 2013.

(51) Int. Cl.
| | | |
|---|---|---|
| *C08F 4/76* | (2006.01) | |
| *C08F 4/50* | (2006.01) | |
| *C08F 4/52* | (2006.01) | |
| *C08F 297/08* | (2006.01) | |
| *C08F 4/64* | (2006.01) | |
| *C08F 4/62* | (2006.01) | |

(52) U.S. Cl.
CPC ...... *C08F 4/76* (2013.01); *C08F 4/50* (2013.01); *C08F 4/52* (2013.01); *C08F 297/08* (2013.01); *C08F 4/62148* (2013.01); *C08F 4/64148* (2013.01)

(58) Field of Classification Search
CPC ..... C08F 4/50; C08F 4/62148; C08F 4/64148
USPC .................. 526/113, 172, 161, 183
See application file for complete search history.

(56) References Cited

U.S. PATENT DOCUMENTS

| | | | |
|---|---|---|---|
| 6,683,141 B1 | 1/2004 | Gibson et al. | |
| 7,858,706 B2 | 12/2010 | Arriola et al. | |
| 7,973,116 B2 * | 7/2011 | Hagadorn et al. | 526/172 |
| 2002/0156279 A1 | 10/2002 | Boussie et al. | |
| 2011/0224391 A1 | 9/2011 | Hagadorn et al. | |
| 2011/0301310 A1 * | 12/2011 | Hagadorn et al. | 526/172 |
| 2012/0071616 A1 | 3/2012 | Hagadorn et al. | |

FOREIGN PATENT DOCUMENTS

| | | |
|---|---|---|
| KR | 10-2009-0009948 | 1/2009 |
| WO | 2007/130305 | 11/2007 |
| WO | 2007/130306 | 11/2007 |
| WO | 2007/130307 | 11/2007 |

OTHER PUBLICATIONS

Hustad, P. D. et al., "*Continuous Production of Ethylene-Based Diblock Copolymers Using Coordinative Chain Transfer Polymerization*" Macromolecules, 2007, vol. 40, No. 20, pp. 7061-7064.

Kuhlman, Roger L. et al., "*Investigations of Chain Shuttling Olefin Polymerization Using Deuterium Labeling*" Macromolecules, 2008, vol. 41, No. 12, pp. 4090-4094.

U.S. Appl. No. 61/773,486, filed Mar. 6, 2013, Hagadorn et al.

* cited by examiner

*Primary Examiner* — Rip A Lee

(57) ABSTRACT

A process of producing ethylene $\alpha$-olefin copolymers, especially ethylene block copolymers, comprising contacting ethylene and a $C_3$ to $C_{10}$ $\alpha$-olefin with a transition metal pyridyldiamide (MPN3) catalyst component and an activator, as well as from 10 equivalents to 1000 equivalents relative to the catalyst component of chain transfer agent; isolating an ethylene-$\alpha$-olefin copolymer having a $T_m$ of less than 140° C., a MWD of less than 2.5, and a weight average molecular weight (Mw) within the range of from 5 kDa to 500 kDa. The chain transfer agent can be selected from Group 2, 12 or Group 13 alkyl or aryl compounds.

64 Claims, No Drawings

REVERSIBLE CHAIN-TRANSFER IN POLYOLEFIN POLYMERIZATION WITH PYRIDYLDIAMIDE CATALYSTS

PRIORITY CLAIM

This application claims priority to and the benefit of U.S. Provisional Application No. 61/773,486, filed Mar. 6, 2013.

FIELD OF THE INVENTION

The present inventions relate to the use of transition metal pyridyldiamide catalysts in polymerization processes in the presence of chain transfer agents, such as diethylzinc. The process may be used in batch processes to produce polymers with narrow molecular weight distribution or in series reactors to produce block copolymers, especially ethylene α-olefin copolymers or more particularly ethylene block copolymers. Alternatively, the process may be used to produce end-functionalized polymers.

BACKGROUND OF THE INVENTION

The production of block copolymers may be accomplished through the use of catalysts that undergo rapid and reversible chain transfer to a main-group metal in combination with two or more reactors in series that are operated under different process conditions. To enable this technology, it is useful to identify catalysts and process conditions under which rapid and reversible chain transfer to suitable chain transfer agents occurs. Such technology could be useful in making block copolymers.

A "block copolymer" is a polymer consisting of multiple sequences, or blocks, of the same monomer alternating in series with different monomer blocks. The blocks are covalently bound to each other such as AAAABABBA-BAAAA fashion (A and B are different types of monomers). Block copolymers are classified based on the number of blocks they contain and how the blocks are arranged. For example, block copolymers with two blocks are called diblocks; those with three blocks are triblocks; and those with more than three are called multiblocks. Classifications by arrangement include the linear, or end-to-end, arrangement and the star arrangement, in which one polymer is the base for multiple branches. One common example of block copolymer use is in the making of shoe soles and tire treads. These items are constructed out of SBS rubber, or polystyrene-butadiene-styrene), which is a hard rubber.

The importance of block copolymers can be seen in their wide array of properties. These properties are made possible due to the combination of different polymers in alternating sequence. An example of such property manipulation can be seen in poly(urethane) foams, which are used in bedding and upholstery. Poly(urethane), a multiblock copolymer, is characterized by high-temperature resilience and low-temperature flexibility.

Another important use of block copolymers is in industrial melt-adhesives. By combining polystyrene or polyolefins with polymers which exhibit rubber-like and adhesive properties, sturdy adhesives can be formed which are activated by heat. The structure of this copolymer utilizes polystyrene or polyolefin blocks on the outside and the rubber block on the inside. When heat is applied, the polystyrene or polyolefin parts melt and allow for limited liquid-like flow. The middle section causes adhesion and after the temperature drops, the strength of block copolymer is restored. This property, made possible by the combination of polyolefins with other polymers, makes this block copolymer an important adhesive.

WO 2007/130306 discloses a class of transition metal imidazoldiyl catalysts that are useful for making broad molecular weight distribution polyolefins, but has not been shown to be useful in making the blocky copolymers that are desired. Pyridyldiamide catalysts have been described in U.S. Pat. No. 7,973,116, U.S. 2011/0224391, U.S. 2011/0301310, and U.S. 2012/0071616. These pyridyldiamide catalysts are useful in making very narrow molecular weight distribution (less than 2.5) polyolefins. What is needed is a method of using this type of catalyst in producing narrow molecular weight blocky polyolefins.

Other references of interest include U.S. Pat. No. 7,858,706.

SUMMARY OF THE INVENTION

Disclosed is a process of producing ethylene α-olefin copolymers comprising contacting ethylene and a C3 to C10 α-olefin with a transition metal pyridyldiamide (MPN3) catalyst component and an activator, as well as from 10 or 20 or 50 or 100 equivalents to 600 or 700 or 800 or 1000 equivalents relative to the catalyst component of chain transfer agent; isolating an ethylene-α-olefin copolymer having a Tm of less than 140 or 135° C., a MWD of less than 2.5 or 2.2 or 2.0 or 1.8 or 1.5, and a weight average molecular weight (Mw) within the range of from 5 kDa to 100 or 200 or 300 or 400 or 450 or 500 kDa.

Also disclosed is a process of producing ethylene α-olefin copolymers comprising contacting ethylene and a C3 to C10 α-olefin with a transition metal pyridyldiamide (MPN3) catalyst component and an activator, as well as from 10 or 20 or 50 or 100 equivalents to 600 or 700 or 800 or 1000 equivalents relative to the catalyst component of chain transfer agent; wherein the contacting first takes place in the absence of the chain transfer agent and ethylene-α-olefin copolymer is first isolated having a weight average molecular weight (Mw) within the range of greater than 200 or 300 or 400 or 450 kDa; followed by addition of the chain transfer agent and isolation of ethylene-α-olefin copolymer having a Mw of less than 400 or 300 or 200 or 100 kDa, or within a range of from 5 or 8 kDa to 50 or 100 or 200 kDa.

In so far as the inventions described herein are interrelated by common features, the various descriptive elements and numerical ranges disclosed herein for the process, the MPN3 catalyst, and the method of using the catalyst system can be combined with other descriptive elements and numerical ranges to describe the invention(s); further, for a given element, any upper numerical limit can be combined with any lower numerical limit described herein.

DETAILED DESCRIPTION

The inventors have found a catalyst system and technique for producing very narrow molecular weight olefin copolymers, and in particular, a technique for tailoring the properties of such copolymers by manipulating the chain transfer capabilities of the catalyst system. This type of manipulation is ideally suited for making block copolymers where the lengths of polymer chains are alternately either homopolymer or copolymer. The catalyst system includes a transition metal pyridyldiamide (MPN3) catalyst component and an activator and relative ratios of a chain transfer agent. Thus, the inventors have found a process of producing ethylene α-olefin copolymers comprising contacting ethylene and a C3 to C10 α-olefin with the transition metal pyridyldiamide (MPN3)

catalyst component and an activator, as well as from 10 or more equivalents, up to 1000 equivalents relative to the catalyst component of chain transfer agent, and isolating an ethylene-α-olefin copolymer having a melting point temperature (Tm) of less than 140° C., a MWD of less than 2.5, and a weight average molecular weight (Mw) within the range of from 5 kDa to 500 kDa.

The "chain transfer agent" is any agent capable of transferring a growing polyolefin chain in a catalyzed polymerization process from one growing chain to another molecule or chain, or one portion of a growing chain to another portion of the same or independent chain. The chain transfer agent can be any desirable chemical compound such as those disclosed in WO 2007/130306. Preferably, the chain transfer agent is selected from Group 2, 12 or Group 13 alkyl or aryl compounds; preferably zinc, magnesium or aluminum alkyls or aryls; most preferably where the alkyl is selected independently from methyl, ethyl, propyl, butyl, isobutyl, tertbutyl, pentyl, hexyl, cyclohexyl, and phenyl; and where diethylzinc is particularly preferred. The inventive process is characterized in one aspect in that the presence of the chain transfer agent increases the activity of the MPN3 catalyst component by a factor of at least 2 or 3 or 4 or 5 or 6 relative to the activity under the same conditions when chain transfer agent is not present. Desirably, the activity of the MPN3 catalyst component in the presence of the chain transfer agent (at any level and conditions indicated herein), a desirable feature of the agent, may be within the range of from 90,000 or 100,000 or 150,000 g/mmole/h/bar to 200,000 or 250,000 or 300,000 or 400,000 g/mmole/h/bar. In the absence of the chain transfer agent, the MPN3 catalyst component has an activity of less than 90,000 or 85,000 or 80,000 or 50,000 g/mmole/h/bar, but typically at least 50 or 100 g/mmole/h/bar.

In an exemplary aspect of the overall invention, the contacting of the catalyst system (including the MPN3 and activator) first takes place in the absence of the chain transfer agent and ethylene-α-olefin copolymer is first isolated having a weight average molecular weight (Mw) within the range of greater than 200 or 300 or 400 or 450 kDa; followed by addition of the chain transfer agent and isolation of ethylene-α-olefin copolymer having a Mw of less than 400 or 300 or 200 or 100 kDa, or within a range of from 5 or 8 kDa to 50 or 100 or 200 kDa. In another aspect, the contacting may first take place in the absence of the chain transfer agent, where the ethylene-α-olefin copolymer is first isolated having an MWD within the range of from 1.5 or 1.7 to 2.2 or 2.5; followed by addition of the chain transfer agent and isolation of ethylene-α-olefin copolymer having a MWD of less than 2.0 or 1.7 or 1.5 or 1.3. MWD is defined to be Mw/Mn.

By "isolated", what is meant is that the polymer is contained in a reactor, either in a reactor separate from the initial reactor in which the copolymer is formed, or the same reactor, and conditions are changed during such isolation in order to perform the next step of the polymerization, such as by addition of the chain transfer agent. The first and subsequent steps can be performed in the same reactor, and preferably is so. Alternatively, "isolated" can include actual removal of the formed copolymer in that step and either temporary or long-term storage for later reaction under the same or different conditions as in the first polymerization reaction.

The "catalyst system" is a combination of at least the MPN3 and an activator as is known in the art, and optionally the chain transfer agent. The MPN3 can be described in a number of ways. Preferably, the transition metal pyridyldiamide catalyst component is selected from compounds of the following structural formula:

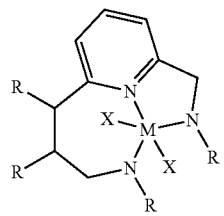

(1)

wherein M is a Group 4 transition metal (numbered as in Hawley's Condensed Chemical Dictionary, 13th ed, 1997), preferably zirconium or hafnium, and each R group is selected independently from hydrogen or alkyls or aryls, and wherein any adjacent R groups may form an aliphatic or aromatic rings; and X is a halogen or alkyl.

More preferably, the transition metal pyridyldiamide catalyst component is selected from the following structural formula (2):

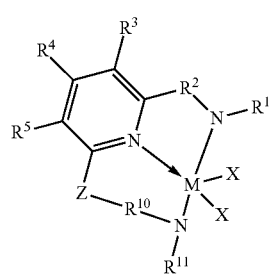

(2)

wherein M is a Group 4 transition metal, preferably hafnium or zirconium, most preferably hafnium;

$R^1$ and $R^{11}$ are independently selected from the group consisting of hydrocarbyls (such as alkyls, aryls), substituted hydrocarbyls (substituents pendant to the hydrocarbyl), heterohydrocarbyls (non-carbon atoms within the hydrocarbyl), and silyl groups;

$R^2$ and $R^{10}$ are each, independently, divalent hydrocarbyls;

$R^3$, $R^4$, and $R^5$ are independently selected from the group consisting of hydrogen, hydrocarbyls (e.g., alkyls and aryls), substituted hydrocarbyls (e.g., heteroaryl), alkoxy, aryloxy, halogen, amino, and silyl, and wherein adjacent R groups may be joined to form a substituted or unsubstituted hydrocarbyl or heterocyclic ring, where the ring has 5, 6, 7, or 8 ring atoms and where substitutions on the ring can join to form additional rings;

X is an anionic leaving group, where the X groups may be the same or different and any two X groups may be linked to form a dianionic leaving group; and Z is $-(R^{14})_p QJ(R^{15})_q-$, wherein Q is carbon, oxygen, nitrogen, or silicon, and where J is carbon or silicon, p is 1 or 2; and q is 1 or 2; and $R^{14}$ and $R^{15}$ are independently selected from the group consisting of hydrogen, hydrocarbyls (preferably alkyls), and substituted hydrocarbyls, and wherein adjacent $R^{14}$ and $R^{15}$ groups may be joined to form an aromatic or saturated, substituted or unsubstituted hydrocarbyl ring, where the ring has 5, 6, 7, or 8 ring carbon atoms and where substitutions on the ring can join to form additional rings.

Even more preferably, the transition metal pyridyldiamide catalyst component is selected from the following structural formula (3):

(3)

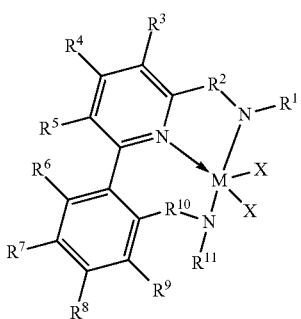

wherein M is a Group 4 transition metal, preferably hafnium; $R^1$ and $R^{11}$ are independently selected from the group consisting of hydrocarbyls (such as alkyls, aryls), substituted hydrocarbyls (substituents pendant to the hydrocarbyl), heterohydrocarbyls (non-carbon atoms within the hydrocarbyl), and silyl groups; $R^2$ and $R^{10}$ are each, independently, divalent C1 to C4 hydrocarbyls or C5 to C12 aryls; $R^3$, $R^4$, $R^5$, $R^6$, $R^7$, $R^8$, $R^9$, are independently selected from the group consisting of hydrogen, hydrocarbyls (e.g., alkyls and aryls, especially C1 to C6 alkyls, cyclic alkyls, and single or double ring aryls), substituted hydrocarbyls (e.g., heteroaryl), alkoxy, aryloxy, halogen, amino, and silyl, and wherein adjacent R groups may be joined to form a substituted or unsubstituted hydrocarbyl or heterocyclic ring, where the ring has 5, 6, 7, or 8 ring atoms and where substitutions on the ring can join to form additional rings; X is an anionic leaving group as described above.

Even more preferably, the transition metal pyridyldiamide catalyst component is selected from compounds of the following structural formula (4):

(4)

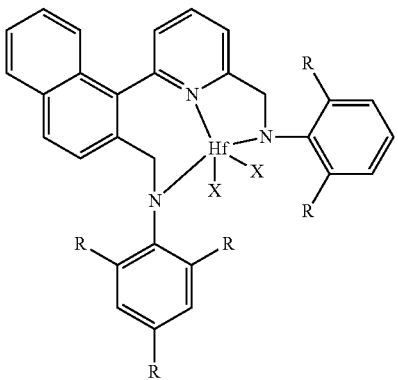

wherein each R group is selected from methyl, ethyl, propyl, isopropyl, isobutyl, and tert-butyl; and X is a halogen or alkyl.

As mentioned, the catalyst system including the MPN3 also includes an activator. The activator (and when used, a scavenger as is common in the polymerization arts) is a compound(s) distinguishable from the chain transfer agent, meaning that the activator or activators used with the MPN3 are not the same chemical compounds as the chain transfer agent. Activators useful for single site catalysts are well known in the art, and common examples include an alumoxane such as methyl alumoxane, $B(C_6F_5)_3$, and N,N-dimethylanilinium tetrakis (pentafluorophenyl)borate. These and others are described in U.S. Pat. No. 7,973,116. The MPN3 complexes are generally subjected to activation to perform their polymerization or oligomerization function using an activator which is believed to create a cation as a result of the removal of an anionic group, often referred to as a leaving group, from the transition metal. Preferred activators include non-coordinating anion activators, such as N,N-dimethylanilinium tetrakis(pentafluorophenyl)borate and triphenylcarbenium tetrakis(pentafluorophenyl)borate.

Useful activators include those selected from the group consisting of: N,N-dimethylanilinium tetrakis(perfluorophenyl)borate, methyldioctadecylammonium tetrakis(perfluorophenyl)borate, methyldi($C_{14-20}$ alkyl)ammonium tetrakis (perfluorophenyl)borate, trimethylammonium tetrakis (perfluoronaphthyl)borate, triethylammonium tetrakis (perfluoronaphthyl)borate, tripropylammonium tetrakis (perfluoronaphthyl)borate, tri(n-butyl)ammonium tetrakis (perfluoronaphthyl)borate, tri(t-butyl)ammonium tetrakis (perfluoronaphthyl)borate, N,N-dimethylanilinium tetrakis (perfluoronaphthyl)borate, N,N-diethylanilinium tetrakis (perfluoronaphthyl)borate, N,N-dimethyl-(2,4,6-trimethylanilinium) tetrakis(perfluoronaphthyl)borate, tropillium tetrakis(perfluoronaphthyl)borate, triphenylcarbenium tetrakis(perfluoronaphthyl)borate, triphenylphosphonium tetrakis(perfluoronaphthyl)borate, triethylsilylium tetrakis(perfluoronaphthyl)borate, benzene(diazonium)tetrakis(perfluoronaphthyl)borate, trimethylammonium tetrakis (perfluorobiphenyl)borate, triethylammonium tetrakis(perfluorobiphenyl)borate, tripropylammonium tetrakis (perfluorobiphenyl)borate, tri(n-butyl)ammonium tetrakis (perfluorobiphenyl)borate, tri(t-butyl)ammonium tetrakis (perfluorobiphenyl)borate, N,N-dimethylanilinium tetrakis (perfluorobiphenyl)borate, N,N-diethylanilinium tetrakis (perfluorobiphenyl)borate, N,N-dimethyl-(2,4,6-trimethylanilinium)tetrakis(perfluorobiphenyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium) tetrakis (perfluorobiphenyl)borate, [4-t-butyl-PhNMe$_2$H][($C_6F_3$ ($C_6F_5)_2)_4$B], (where Ph is phenyl, and Me is methyl).

The complex-to-activator molar ratio is from about 1:3000 to 10:1; alternatively is 1:2000 to 10:1; alternatively 1:1000 to 10:1; alternatively, 1:500 to 1:1; alternatively 1:300 to 1:1; alternatively 1:200 to 1:1; alternatively 1:100 to 1:1; alternatively 1:50 to 1:1; alternatively 1:10 to 1:1. When the activator is an alumoxane (modified or unmodified), some embodiments select the maximum amount of activator at a 5000-fold molar excess over the catalyst precursor (per metal catalytic site). The preferred minimum activator-to-complex ratio is 1:1 molar ratio, especially for the boron-type activators (so called "non-coordinating anions").

The inventive process is directed to polymerizing unsaturated monomers conventionally known to undergo metallocene-catalyzed polymerization such as solution, slurry, gasphase, and high-pressure polymerization. Typically one or more of the MPN3 complexes described herein, one or more activators, and one or more monomers are contacted to produce polymer. In embodiments of the invention one MPN3 complexes described herein may be used in the polymerization. (By one is meant that the complexes are not different; different means the complexes differ by at least one atom.) The complexes may be supported and as such will be particularly useful in the known, fixed-bed, moving-bed, fluid-bed, slurry, solution, or bulk operating modes conducted in single, series, or parallel reactors.

One or more reactors in series or in parallel may be used in the present invention. The complexes, activator and when required, co-activator, may be delivered as a solution or slurry, either separately to the reactor, activated in-line just prior to the reactor, or preactivated and pumped as an activated solution or slurry to the reactor. Polymerizations are carried out in either single reactor operation, in which monomer, comonomers, catalyst/activator/co-activator, optional scavenger, and optional modifiers are added continuously to a single reactor or in series reactor operation, in which the above components are added to each of two or more reactors connected in series. The MPN3 catalyst components can be added to the first reactor in the series. The catalyst component may also be added to both reactors, with one component being added to first reaction and another component to other reactors. In one preferred embodiment, the complex is activated in the reactor in the presence of olefin.

In a particularly preferred embodiment, the polymerization process is a continuous process. The term "continuous" means a system that operates without interruption or cessation. For example, a continuous process to produce a polymer would be one where the reactants are continually introduced into one or more reactors and polymer product is continually withdrawn.

A solution polymerization means a polymerization process in which the polymer is dissolved in a liquid polymerization medium, such as an inert solvent or monomer(s) or their blends. A solution polymerization is typically homogeneous. A homogeneous polymerization is one where the polymer product is dissolved in the polymerization medium. Such systems are preferably not turbid as described in J. Vladimir Oliveira, C. Dariva and J. C. Pinto, 29 Ind. Eng, Chem. Res., 4627 (2000).

A bulk polymerization means a polymerization process in which the monomers and/or comonomers being polymerized are used as a solvent or diluent using little or no inert solvent as a solvent or diluent. A small fraction of inert solvent might be used as a carrier for catalyst and scavenger. A bulk polymerization system contains less than 25 wt % of inert solvent or diluent, preferably less than 10 wt %, preferably less than 1 wt %, and most preferably 0 wt %.

Polymerization process used herein typically comprises contacting one or more alkene monomers with the complex(es) (and, optionally, activator) described herein. For the purpose of this invention, alkenes are defined to include multi-alkenes (such as dialkenes) and alkenes having just one double bond. Polymerization may be homogeneous (solution or bulk polymerization) or heterogeneous (slurry in a liquid diluent, or gas phase in a gaseous diluent). In the case of heterogeneous slurry or gas phase polymerization, the complex and activator may be supported. Silica is useful as a support herein.

The present polymerization processes may be conducted under conditions preferably including a temperature of about 30° C. to about 200° C., preferably from 60° C. to 195° C., preferably from 75° C. to 190° C. The process may be conducted at a pressure of from 0.05 or 0.10 MPa to 20 or 100 or 500 or 1500 MPa. Under supercritical conditions, the pressure is between 15 MPa and 1500 MPa.

Desirably, the catalyst system described herein is used in any polymerization process known in the art, in particular, as described above, to produce ethylene homopolymers or copolymers, especially ethylene block copolymers. In a preferred embodiment, the catalyst complexes described herein are used in any polymerization process described above to produce ethylene α-olefin copolymers of comonomer-derived units ("comonomers") selected from branched or linear alpha-olefins. Suitable olefins include propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, and blends thereof, most preferably 1-hexene or 1-octene.

While the molecular weight of the polymers produced herein is influenced by reactor conditions including temperature, monomer concentration and pressure, the presence of chain terminating agents and the like, the homopolymer and copolymer products produced by the present process may have a weight average molecular weight (Mw) within the range of from 1,000 or 50,000 or 100,000 g/mol to about 2,000,000 g/mol as determined by Gel Permeation Chromatography. In a preferred embodiment, the comonomer(s) are present at up to 50 mol %, preferably from 0.01 to 40 mol %, preferably 1 to 30 mol %, preferably from 5 to 20 mol % and have a narrow (less than 2.5 or 2.0) molecular weight distribution as described herein.

The possession and usefulness of the invention(s) are demonstrated in the following examples, which are not intended to be limiting of the scope of the appended claims.

EXAMPLES

Room temperature is 23° C. unless otherwise indicated.
Tests and Materials
NCA1 is N,N-dimethylanilinium tetrakis(pentafluorophenylborate).

Complexes 1 and 2 are shown in Table 1, where Me is methyl. Complex 1 was prepared as described in US 2011/0301310 A1. Complex 3 is rac-dimethylsilyl-bis(indenyl) hafnium dimethyl. It was purchased from Albelmarle.

TABLE 1

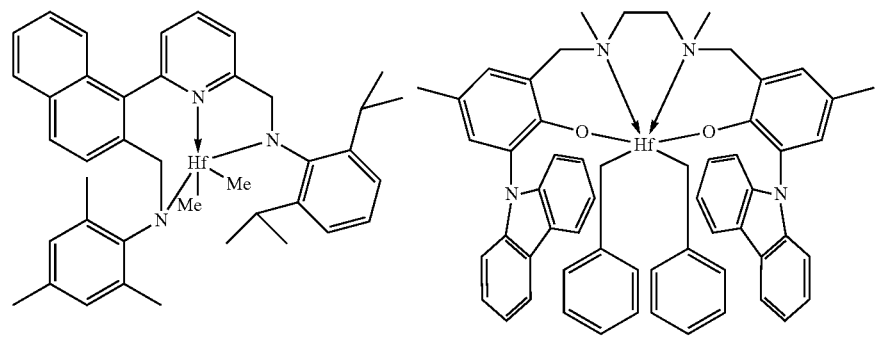

Complex 1  Complex 2

Preparation of Complex 2. 2-Bromo-4-methylanisole (20.11 g, 100 mmol, 1 equiv) and carbazole (20.06 g, 120 mmol, 1.2 equiv) were dissolved in 1,4-dioxane (400 mL). Potassium phosphate tribasic (37.15 g, 175 mmol, 1.75 equiv), copper (I) iodide (0.95 g, 5 mmol, 0.05 equiv) and racemic trans-1,2-diaminocyclohexane (2.4 mL, 20 mmol, 0.2 equiv) were added and the reaction was refluxed for two days. The reaction was cooled to room temperature, then partitioned with ethyl acetate (200 mL) and water (300 mL). The aqueous layer was extracted with ethyl acetate (3×200 mL). The combined organic layers were washed with saturated brine, dried over sodium sulfate, filtered, and concentrated under reduced pressure. The residue was purified over silica gel (150 g), eluting with 3% ethyl acetate in heptanes to give 9-(2-methoxy-5-methylphenyl)-9H-carbazole (13.5 g, 45% yield) as a yellow solid.

A 1.0 M boron tribromide solution in dichloromethane (90 mL, 90 mmol, 1.9 equiv) was added dropwise at -78° C., over 30 minutes, to a solution of 9-(2-methoxy-5-methylphenyl)-9H-carbazole (13.5 g, 46.98 mmol, 1 equiv) in anhydrous dichloromethane (400 mL). The reaction was warmed to room temperature, when liquid chromatography—mass spectrometry (LCMS) indicated that the reaction was complete. The reaction was quenched with ice-water (200 mL). The layers were separated and the aqueous phase was extracted with dichloromethane (2×100 mL). The combined organic layers were dried over sodium sulfate, filtered, and concentrated under reduced pressure. The residue was purified on an ANALOGIX 40-150 g column, eluting with a gradient of 0 to 20% ethyl acetate in heptanes to give 2-(9H-carbazol-9-yl)-4-methylphenol (12.3 g, 95% yield) as a yellow oil.

A mixture of 2-(9H-carbazol-9-yl)-4-methylphenol (3.4 g, 12.44 mmol, 2 equiv), paraformaldehyde (1.87 g, 62.2 mmol, 10 equiv), N,N'-dimethylethylenediamine (0.67 mL, 6.22 mmol, 1 equiv) and anhydrous ethanol (100 mL) was refluxed for 18 hours. The reaction was cooled to room temperature, and then concentrated under reduced pressure. The residue was purified on an ANALOGIX 25-60 g column, eluting with a gradient of 0 to 30% ethyl acetate in heptanes to give 6,6'-((ethane-1,2-diylbis(methylazanediyl))bis(methylene))-bis(2-(9H-carbazol-9-yl)-4-methylphenol) (1.1 g, 27% yield) as a white solid.

Under a nitrogen atmosphere, a toluene solution (5 mL) of 6,6'-((ethane-1,2-diylbis(methylazanediyl))bis(methylene)) bis(2-(9H-carbazol-9-yl)-4-methylphenol) (107 mg, 0.17 mmol) was added to a yellow toluene solution (5 mL) of ZrBn4 (77 mg, 0.17 mmol), forming a deep yellow solution. After stirring at room temperature for 15 minutes, the solvent was removed to give a yellow sticky solid. The product was washed with pentane and dried under vacuum to give complex 2 as a yellow solid (yield 135 mg, 88%).

General Polymerization Procedures

Ethylene homopolymerizations and ethylene/1-octene copolymerizations were carried out in a parallel, pressure reactor, as generally described in U.S. Pat. Nos. 6,306,658; 6,455,316; and 6,489,168; and International Patent Publication No. WO 00/09255; and Murphy et al., 125 J. Am. Chem. Soc., 4306-4317 (2003), each of which is fully incorporated herein by reference to the extent not inconsistent with this specification. A pre-weighed glass vial insert and disposable stirring paddle were fitted to each reaction vessel of the reactor, which contains 48 individual reaction vessels. The reactor was then closed and each vessel was individually heated to a set temperature (usually between 50° C. and 110° C., see Table 2) and pressurized to a predetermined pressure of 1.38 MPa (200 psi) ethylene. 1-Octene (100 microliters, 637 micromol) was injected into each reaction vessel through a valve, followed by enough toluene to bring the total reaction volume, including the subsequent additions, to 5 mL. Tri-n-octylaluminum in toluene and any additional chain transfer agent (e.g., $Et_2Zn$) were then added. The contents of the vessel were then stirred at 800 rpm. An activator solution (typically either 1.0-1.1 equiv of 0.40 mM dimethyl anilinium tetrakis-pentafluorophenyl borate (NCAl)) in toluene was then injected into the reaction vessel along with 500 microliters toluene, followed by a toluene solution of catalyst (0.40 mM in toluene, between 20-80 nanomols of catalyst and another aliquot of toluene (500 microliters)). Equivalence is determined based on the mol equivalents relative to the moles of the transition metal in the catalyst complex.

The reaction was then allowed to proceed until 20 psi (0.138 MPa) ethylene had been taken up by the reaction (ethylene pressure was maintained in each reaction vessel at the pre-set level by computer control). At this point, the reaction was quenched by pressurizing the vessel with compressed air. After the polymerization reaction, the glass vial insert containing the polymer product and solvent was removed from the pressure cell and the inert atmosphere glove box, and the volatile components were removed using a Genevac HT-12 centrifuge and Genevac VC3000D vacuum evaporator operating at elevated temperature and reduced pressure. The vial was then weighed to determine the yield of the polymer product. The resultant polymer was analyzed by Rapid GPC (see below) to determine the molecular weight, by FT-IR (see below) to determine octene incorporation, and by DSC (see below) to determine melting point.

To determine various molecular weight related values by GPC, high temperature size exclusion chromatography was performed using an automated "Rapid GPC" system as generally described in U.S. Pat. Nos. 6,491,816; 6,491,823; 6,475,391; 6,461,515; 6,436,292; 6,406,632; 6,175,409; 6,454,947; 6,260,407; and 6,294,388. This apparatus has a series of three 30 cm×7.5 mm linear columns, each containing PLgel 10 um, Mix B. The GPC system was calibrated using polystyrene standards ranging from 580 g/mol-3,390,000 g/mol. The system was operated at an eluent flow rate of 2.0 mL/min and an oven temperature of 165° C. 1,2,4-trichlorobenzene was used as the eluent. The polymer samples were dissolved in 1,2,4-trichlorobenzene at a concentration of 0.1-0.9 mg/mL. 250 µL of a polymer solution was injected into the system. The concentration of the polymer in the eluent was monitored using an evaporative light scattering detector. The molecular weights presented in the examples are relative to linear polystyrene standards.

Differential Scanning calorimetry (DSC) measurements were performed on a TA-Q100 instrument to determine the melting point of the polymers (for purposes of the claims, the following DSC method shall be used). Samples were pre-annealed at 220° C. for 15 minutes and then allowed to cool to room temperature overnight. The samples were then heated to 220° C. at a rate of 100° C/min and then cooled at a rate of 50° C/min. Melting points were collected during the heating period.

The amount of 1-octene to ethylene incorporated in the polymers (weight %) was determined by rapid FT-IR spectroscopy on a Bruker Equinox 55+IR in reflection mode. Samples were prepared in a thin film format by evaporative deposition techniques. Weight percent 1-octene was obtained from the ratio of peak heights at 1378 and 4322 cm-1. This method was calibrated using a set of ethylene/1-octene copolymers with a range of known wt % 1-octene content.

Example 1

Effect of added chain transfer agent on ethylene homopolymerization and ethylene-octene copolymerization. The general polymerization process described above was used. The general conditions were: temperature=80° C., total volume=5 mL, solvent=isohexane, catalyst=20 nmol, activator=20 nmol, ethylene=75 psi, tri-n-octylaluminum=300 nmol. Additional specific conditions, results, and polymer characterization data are shown in Table 2. Comparing run 1 to run 3 it is apparent that the addition of diethylzinc to an ethylene homopolymerization leads to a large increase in catalyst activity, a lowering of molecular weight of the polymer, and a narrowing of the polydispersity index (PDI, which is defined as Mw/Mn) of the polymer. Similar results were observed for ethylene-octene copolymerizations, as demonstrated by comparison of run 2 to run 4.

through 6 used the catalyst system complex 1/NCA1. Those runs that included diethylzinc (runs 2, 3, 5, 6) produced polymer with relatively narrow PDI; these were effective at rapid, reversible coordinative chain transfer polymerization (CCTP). Runs 7-10 used the catalyst system complex 3/NCA1. The metallocene complex 3/NCA1 was completely inactive in the presence of 100 or 500 molar equivalents of diethylzinc (runs 8, 9, 11, 12); this catalyst was ineffective for CCTP. Runs 13-18 used the catalyst system complex 2/NCA1. This catalyst maintained some polymerization activity in the presence of 100 molar equivalents of diethylzinc (runs 14 and 17), but there was no measurable effect on the PDI of the polymers, so it was not an effective catalyst for CCTP.

TABLE 2

Polymerization conditions and polymer characterization data.

| run | complex/ activator | $Et_2Zn/Hf$ ratio | 1-octene (mL) | run time (s) | yield (mg) | activity (g/mmol/h/bar) | Mw (kDa) | Mn (kDa) | Mw/ Mn | wt % octene |
|---|---|---|---|---|---|---|---|---|---|---|
| 1* | 1/NCA1 | 0 | 0 | 29 | 72 | 87,642 | 396 | 223 | 1.8 | 0 |
| 2* | 1/NCA1 | 0 | 0.1 | 47 | 100 | 74,423 | 489 | 285 | 1.7 | 31 |
| 3 | 1/NCA1 | 500 | 0 | 10 | 89 | 302,538 | 12.4 | 11.2 | 1.1 | 0 |
| 4 | 1/NCA1 | 500 | 0.1 | 12 | 78 | 219,206 | 11.1 | 9.3 | 1.2 | 15 |

*comparative

Example 2

The general polymerization process described above was used. The general conditions were: temperature=80° C., total volume=5 mL, solvent=isohexane, catalyst=20 nmol, activator=22 nmol, ethylene=75 psi, tri-n-octylaluminum=375 nmol (scavenger). Additional specific conditions, results, and polymer characterization data are shown in Table 3. Runs 1

TABLE 3

Polymerization conditions and polymer characterization data.

| run | complex/ activator | $Et_2Zn/Hf$ ratio | 1-octene (mL) | run time (s) | yield (mg) | activity (g/mmol/h/bar) | Mw (kDa) | Mn (kDa) | Mw/ Mn | wt % octene |
|---|---|---|---|---|---|---|---|---|---|---|
| 1* | 1/NCA1 | 0 | 0 | 55 | 83 | 52,530 | 456 | 307 | 1.5 | 0 |
| 2 | 1/NCA1 | 100 | 0 | 14 | 90 | 223,773 | 58 | 51 | 1.1 | 0 |
| 3 | 1/NCA1 | 500 | 0 | 8 | 86 | 374,198 | 12 | 11 | 1.1 | 0 |
| 4* | 1/NCA1 | 0 | 127 | 97 | 110 | 39,474 | 540 | 363 | 1.5 | 30 |
| 5 | 1/NCA1 | 100 | 127 | 13 | 96 | 257,052 | 64 | 54 | 1.2 | 22 |
| 6 | 1/NCA1 | 500 | 127 | 13 | 70 | 187,434 | 10 | 9 | 1.2 | 27 |
| 7* | 3/NCA1 | 0 | 0 | 45 | 68 | 52,600 | 1,055 | 583 | 1.8 | 0 |
| 8* | 3/NCA1 | 100 | 0 | 1802 | <5 | low | | | | |
| 9* | 3/NCA1 | 500 | 0 | 1802 | <5 | low | | | | |
| 10* | 3/NCA1 | 0 | 127 | 29 | 110 | 132,035 | 268 | 170 | 1.6 | 35 |
| 11* | 3/NCA1 | 100 | 127 | 1802 | <5 | low | | | | |
| 12* | 3/NCA1 | 500 | 127 | 1802 | <5 | low | | | | |
| 13* | 2/NCA1 | 0 | 0 | 46 | 48 | 36,323 | 69 | 45 | 1.5 | 0 |
| 14* | 2/NCA1 | 100 | 0 | 48 | 43 | 31,183 | 38 | 25 | 1.5 | 0 |
| 15* | 2/NCA1 | 500 | 0 | 1802 | 7 | low | | | | |
| 16* | 2/NCA1 | 0 | 127 | 64 | 41 | 22,300 | 65 | 43 | 1.5 | 4 |
| 17* | 2/NCA1 | 100 | 127 | 116 | 31 | 9,302 | 33 | 22 | 1.5 | 7 |
| 18* | 2/NCA1 | 500 | 127 | 1800 | <5 | low | | | | |

*comparative

Example 3

Effect of added chain transfer agent on ethylene homopolymerization and ethylene-octene copolymerization. The general polymerization process described above was used. The general conditions were: temperature=80° C., total volume=5 mL, solvent=isohexane, catalyst=16 nmol, activator=17.6 nmol, ethylene=75 psi, tri-n-octylaluminum=300 nmol. Additional specific conditions, results, and polymer characterization data are shown in Table 4. Runs 2-9 demonstrate the effect of increasing amounts of diethylzinc on ethylene hompolymerization catalyzed by complex 1/NCAl. The data shows that narrow PDI products were obtained for Zn/Hf ratios from 75 to 600. Runs 11-18 demonstrate the effect of increasing amounts of diethylzinc on ethylene-octene copolymerization catalyzed by complex 1/NCAl. The data shows that narrow PDI products were obtained for Zn/Hf ratios from 75 to 600. Thus Zn/catalyst ratios from 75-600 have been demonstrated to be effective rapid, reversible CCTP of alkenes.

TABLE 4

Polymerization conditions and polymer characterization data.

| run | complex/ activator | Et$_2$Zn/Hf ratio | 1-octene (mL) | run time (s) | yield (mg) | activity (g/mmol/h/bar) | Mw (kDa) | Mn (kDa) | Mw/Mn | wt % octene |
|---|---|---|---|---|---|---|---|---|---|---|
| 1* | 1/NCA1 | 0 | 0 | 44 | 83 | 82,078 | 541 | 329 | 1.6 | 0 |
| 2 | 1/NCA1 | 75 | 0 | 14 | 88 | 273,500 | 82 | 74 | 1.1 | 0 |
| 3 | 1/NCA1 | 150 | 0 | 11 | 87 | 344,136 | 45 | 41 | 1.1 | 0 |
| 4 | 1/NCA1 | 225 | 0 | 12 | 87 | 315,458 | 32 | 30 | 1.1 | 0 |
| 5 | 1/NCA1 | 300 | 0 | 10 | 86 | 374,198 | 23 | 21 | 1.1 | 0 |
| 6 | 1/NCA1 | 375 | 0 | 10 | 73 | 317,633 | 16 | 15 | 1.1 | 0 |
| 7 | 1/NCA1 | 450 | 0 | 12 | 70 | 253,817 | 13 | 12 | 1.1 | 0 |
| 8 | 1/NCA1 | 525 | 0 | 10 | 73 | 317,633 | 12 | 11 | 1.1 | 0 |
| 9 | 1/NCA1 | 600 | 0 | 10 | 76 | 330,687 | 11 | 10 | 1.1 | 0 |
| 10* | 1/NCA1 | 0 | 127 | 146 | 106 | 31,590 | 661 | 417 | 1.6 | 27 |
| 11 | 1/NCA1 | 75 | 127 | 16 | 88 | 239,313 | 86 | 74 | 1.2 | 21 |
| 12 | 1/NCA1 | 150 | 127 | 16 | 88 | 239,313 | 48 | 42 | 1.2 | 18 |
| 13 | 1/NCA1 | 225 | 127 | 13 | 91 | 304,580 | 33 | 29 | 1.2 | 19 |
| 14 | 1/NCA1 | 300 | 127 | 13 | 64 | 214,210 | 19 | 17 | 1.2 | 17 |
| 15 | 1/NCA1 | 375 | 127 | 21 | 56 | 116,030 | 13 | 11 | 1.2 | 18 |
| 16 | 1/NCA1 | 450 | 127 | 25 | 49 | 85,282 | 10 | 8 | 1.2 | 24 |
| 17 | 1/NCA1 | 525 | 127 | 38 | 42 | 48,092 | 7 | 6 | 1.2 | 28 |
| 18 | 1/NCA1 | 600 | 127 | 58 | 33 | 24,756 | 5 | 4 | 1.2 | 31 |

*comparative

Example 4

Effect of added chain transfer agent on ethylene-hexene copolymerization. Semi-continuous ethylene polymerization was performed in a stirred 1 L autoclave reactor. Details of polymerization conditions and the products formed are described in Table 5. All solvents, reactants, and gases were purified by passing through multiple columns containing 3 angstrom molecular sieves and oxygen scavenger. Tri-n-octylaluminum (0.10 mmol) and diethylzinc (0.10 mmol) were added to the reactor followed by 1-hexene and isohexane (500 mL). The mixture was brought to the desired temperature. Then a toluene solution (5 mL) of complex 1 (0.20 mmol) and a toluene solution (5 mL) of NCAl were flushed into the reactor with isohexane (100 mL) Immediately the reactor was pressurized with ethylene to 100 psi above the measured reactor pressure before the ethylene addition. Polymerization was carried out for a set amount of time and then a 10 mL of a quenching agent (e.g. methanol or isopropanol) was injected into the reactor. The reactor was then cooled, depressurized, and opened. The residual volatiles in the product were removed under a stream of nitrogen, followed by heating the sample in a vacuum oven at 60° C. The polymer produced was found to have a narrow PDI which indicated effective CCTP under these reaction conditions.

Mn, Mw, and Mz shown in Table 5 were measured by using a Gel Permeation Chromatography (GPC) method using a High Temperature Size Exclusion Chromatograph (SEC, either from Waters Corporation or Polymer Laboratories), equipped with a differential refractive index detector (DRI) (for purposes of the claims, the following GPC method shall be used). Experimental details, are described in: T. Sun, P. Brant, R. R. Chance, and W. W. Graessley, 34(19) Macromolecules, 6812-6820 (2001) and references therein. Three Polymer Laboratories PLgel 10mm Mixed-B columns are used. The nominal flow rate is 0.5 cm$^3$/min and the nominal injection volume is 300 μL. The various transfer lines, columns and differential refractometer (the DRI detector) are contained in an oven maintained at 135° C. Solvent for the SEC experiment is prepared by dissolving 6 grams of butylated hydroxy toluene as an antioxidant in 4 liters of Aldrich reagent grade 1,2,4 trichlorobenzene (TCB). The TCB mixture is then filtered through a 0.7 μm glass pre-filter and subsequently through a 0.1 μm Teflon filter. The TCB is then degassed with an online degasser before entering the SEC. Polymer solutions are prepared by placing dry polymer in a glass container, adding the desired amount of TCB, then heating the mixture at 160° C. with continuous agitation for about 2 hours. All quantities are measured gravimetrically. The TCB densities used to express the polymer concentration in mass/volume units are 1.463 g/mL at room temperature and 1.324 g/mL at 135° C. The injection concentration is from 1.0 to 2.0 mg/mL, with lower concentrations being used for higher molecular weight samples. Prior to running each sample the DRI detector and the injector are purged. Flow rate in the apparatus is then increased to 0 5 mL/minute, and the DRI is allowed to stabilize for 8 to 9 hours before injecting the first sample. The concentration, c, at each point in the chromatogram is calculated from the baseline-subtracted DRI signal, IDRI, using the following equation:

$$c = K_{DRI} I_{DRI}/(dn/dc)$$

where KDRI is a constant determined by calibrating the DRI, and (dn/dc) is the refractive index increment for the system. The refractive index, n=1.500 for TCB at 135° C. and λ=690 nm. For purposes of this invention and the claims thereto (dn/dc)=0.104 for propylene polymers and ethylene polymers, and 0.1 otherwise. Units of parameters used throughout this description of the SEC method are: concentration is expressed in g/cm$^3$, molecular weight is expressed in g/mol, and intrinsic viscosity is expressed in dL/g.

TABLE 5

Polymerization conditions and polymer characterization data.

| run | complex/ activator | Et$_2$Zn/Hf ratio | 1-hexene (mL) | Temp (deg C.) | run time (min) | yield (g) | GPC-DRI Mw (kDa) | GPC-DRI Mn (kDa) | Mw/Mn |
|---|---|---|---|---|---|---|---|---|---|
| 1 | 1/NCA1 | 50 | 10 | 90 | 5 | 24 | 81.2 | 54.4 | 1.49 |

Now, having described the various features of the MPN3 catalyst component, catalyst system, and method of using the catalyst component and system in making polyolefins, described here in numbered embodiments is:

1. A process of producing ethylene α-olefin copolymers comprising:
    contacting ethylene and a C$_3$ to C$_{10}$ α-olefin with a transition metal pyridyldiamide (MPN3) catalyst component and an activator, as well as from 10 or 20 or 50 or 100 equivalents to 600 or 700 or 800 or 1000 equivalents relative to the catalyst component of chain transfer agent;
    isolating an ethylene-α-olefin copolymer having a T$_m$, of less than 140 or 135° C., a MWD of less than 2.5 or 2.2 or 2.0 or 1.8 or 1.5, and a weight average molecular weight (Mw) within the range of from 5 kDa to 100 or 200 or 300 or 400 or 450 or 500 kDa.
2. A process of producing ethylene α-olefin copolymers comprising:
    contacting ethylene and a C$_3$ to C$_{10}$ α-olefin with a transition metal pyridyldiamide (MPN3) catalyst component and an activator, as well as from 10 or 20 or 50 or 100 equivalents to 600 or 700 or 800 or 1000 equivalents relative to the catalyst component of chain transfer agent;
    wherein the contacting first takes place in the absence of the chain transfer agent and ethylene-α-olefin copolymer is first isolated having a weight average molecular weight (Mw) within the range of greater than 200 or 300 or 400 or 450 kDa; followed by addition of the chain transfer agent and isolation of ethylene-α-olefin copolymer having a Mw of less than 400 or 300 or 200 or 100 kDa, or within a range of from 5 or 8 kDa to 50 or 100 or 200 kDa.
3. A process of producing ethylene α-olefin copolymers comprising:
    contacting ethylene and a C$_3$ to C$_{10}$ α-olefin with a transition metal pyridyldiamide (MPN3) catalyst component and an activator, as well as from 10 or 20 or 50 or 100 equivalents to 600 or 700 or 800 or 1000 equivalents relative to the catalyst component of chain transfer agent;
    wherein the contacting first takes place in the absence of the chain transfer agent and ethylene-α-olefin copolymer is first isolated having an MWD within the range of from 1.5 or 1.7 to 2.2 or 2.5; followed by addition of the chain transfer agent and isolation of ethylene-α-olefin copolymer having a MWD of less than 2.0 or 1.7 or 1.5 or 1.3.
4. The process of any one of numbered embodiments 1 to 3, wherein the chain transfer agent is selected from Group 2, 12 or Group 13 alkyl or aryl compounds; preferably zinc, magnesium or aluminum alkyls or aryls; most preferably where the alkyl is selected independently from methyl, ethyl, propyl, butyl, isobutyl, tertbutyl, pentyl, hexyl, cyclohexyl, and phenyl, and where diethyl zinc is particularly preferred.
5. The process of any one of numbered embodiments 1 to 4, wherein the presence of the chain transfer agent increases the activity of the catalyst component by a factor of at least 2 or 3 or 4 or 5 or 6 relative to the activity under the same conditions when the chain transfer agent is not present.
6. The process of any one of the previous numbered embodiments, wherein the transition metal pyridyldiamide catalyst component is selected from compounds of the following structural formula:

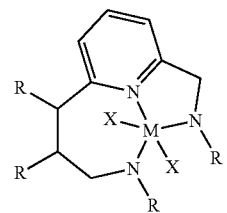

wherein M is a Group 4 transition metal (preferably Hf), and each R group is selected independently from hydrogen or alkyls or aryls, and wherein any adjacent R groups may form an aliphatic or aromatic ring; and X is a halogen or alkyl.

7. The process of any one of the previous numbered embodiments, wherein the transition metal pyridyldiamide catalyst component is selected from the following structural formula:

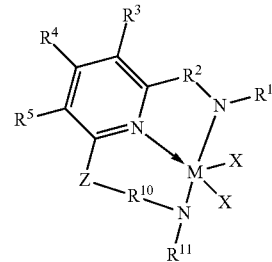

wherein M is a Group 4 transition metal (preferably Hf);
R$^1$ and R$^{11}$ independently ndependently selected from the group consisting of hydrocarbyls (such as alkyls, aryls), substituted hydrocarbyls (substituents pendant to the hydrocarbyl), heterohydrocarbyls (non-carbon atoms within the hydrocarbyl), and silyl groups;
R$^2$ and R$^{10}$ are each, independently, divalent hydrocarbyls or aryls;
R$^3$, R$^4$, and R$^5$ are independently selected from the group consisting of hydrogen, hydrocarbyls (e.g., alkyls and aryls), substituted hydrocarbyls (e.g., heteroaryl), alkoxy, aryloxy, halogen, amino, and silyl, and wherein adjacent R groups may be joined to form a substituted or unsubstituted hydrocarbyl or heterocyclic ring, where the ring has 5, 6, 7, or 8 ring atoms and where substitutions on the ring can join to form additional rings;

X is an anionic leaving group, where the X groups may be the same or different and any two X groups may be linked to form a dianionic leaving group;

Z is $-(R^{14})_p QJ(R^{15})_q-$, wherein Q is carbon, oxygen, nitrogen, or silicon, and where J is carbon or silicon, p is 1 or 2; and q is 1 or 2; and $R^{14}$ and $R^{15}$ are independently selected from the group consisting of hydrogen, hydrocarbyls (preferably alkyls), and substituted hydrocarbyls, and wherein adjacent $R^{14}$ and $R^{15}$ groups may be joined to form an aromatic or saturated, substituted or unsubstituted hydrocarbyl ring, where the ring has 5, 6, 7, or 8 ring carbon atoms and where substitutions on the ring can join to form additional rings.

8. The process of any one of the previous numbered embodiments, wherein the transition metal pyridyldiamide catalyst component is selected from the following structural formula:

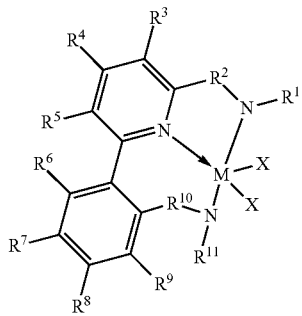

wherein M is a Group 4 transition metal (preferably Hf);

$R^1$ and $R^{11}$ are independently selected from the group consisting of hydrocarbyls (such as alkyls, aryls), substituted hydrocarbyls (substituents pendant to the hydrocarbyl), heterohydrocarbyls (non-carbon atoms within the hydrocarbyl), and silyl groups;

$R^2$ and $R^{10}$ are each, independently, divalent $C_1$ to $C_4$ hydrocarbyls or $C_5$ to $C_{12}$ aryls;

$R^3$, $R^4$, $R^5$, $R^6$, $R^7$, $R^8$, $R^9$, are independently selected from the group consisting of hydrogen, hydrocarbyls (e.g., alkyls and aryls), substituted hydrocarbyls (e.g., heteroaryl), alkoxy, aryloxy, halogen, amino, and silyl, and wherein adjacent R groups may be joined to form a substituted or unsubstituted hydrocarbyl or heterocyclic ring, where the ring has 5, 6, 7, or 8 ring atoms and where substitutions on the ring can join to form additional rings; and X is an anionic leaving group, where the X groups may be the same or different and any two X groups may be linked to form a dianionic leaving group.

9. The process of any one of the previous numbered embodiments, wherein the transition metal pyridyldiamide catalyst component is selected from compounds of the following structural formula:

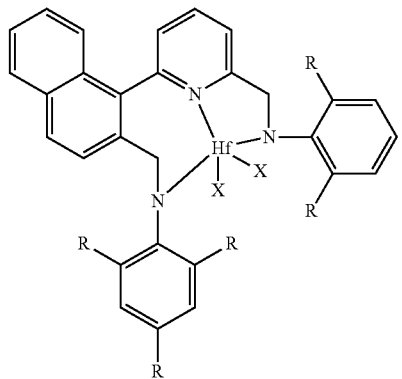

wherein each R group is selected from methyl, ethyl, propyl, isopropyl, isobutyl, and tert-butyl; and X is a halogen or alkyl.

10. The process of numbered embodiment 1, wherein the contacting first takes place in the absence of the chain transfer agent and ethylene-α-olefin copolymer is first isolated having a weight average molecular weight (Mw) within the range of greater than 200 or 300 or 400 or 450 kDa; followed by addition of the chain transfer agent and isolation of ethylene-α-olefin copolymer having a Mw of less than 400 or 300 or 200 or 100 kDa, or within a range of from 5 or 8 kDa to 50 or 100 or 200 kDa.

11. The process of numbered embodiment 1, wherein the contacting first takes place in the absence of the chain transfer agent and ethylene-α-olefin copolymer is first isolated having an MWD within the range of from 1.5 or 1.7 to 2.2 or 2.5; followed by addition of the chain transfer agent and isolation of ethylene-α-olefin copolymer having a MWD of less than 2.0 or 1.7 or 1.5 or 1.3.

12. The process of any one of the previous numbered embodiments, wherein the activator is a compound(s) distinguishable from the chain transfer agent.

13. An ethylene α-olefin copolymer made by the process of any one of the previous numbered embodiments.

14. A catalyst system including an MPN3, chain transfer agent and activator of any one of the previous numbered embodiments.

15. The use of a catalyst system described in any one of the previous numbered embodiments 1 to 12 in a process as described in any one of numbered embodiments 1 to 3 to make an ethylene α-olefin copolymer.

16. The process of any one of numbered embodiments 1 to 15 where one MPN3 complex is used.

All documents described herein are incorporated by reference herein, including any priority documents and/or testing procedures to the extent they are not inconsistent with this text, provided however that any priority document not named in the initially filed application or filing documents is NOT incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law. Likewise whenever a composition, an element or a group of elements is preceded with the transitional phrase "comprising", it is understood that we also contemplate the same composition or group of elements with transitional phrases "consisting essentially of," "consisting of', "selected from the group of consisting of," or "is" preceding the recitation of the composition, element, or elements and vice versa.

The invention claimed is:

1. A process of producing ethylene α-olefin copolymers comprising:

contacting ethylene and a $C_3$ to $C_{10}$ α-olefin with a transition metal pyridyldiamide catalyst component and an activator, as well as from 10 equivalents to 1000 equivalents relative to the catalyst component of chain transfer agent;

isolating an ethylene-α-olefin copolymer having a $T_m$ of less than 140° C., a Mw/Mn of less than 2.5, and a weight average molecular weight (Mw) within the range of from 5 kDa to 500 kDa, wherein the contacting first takes place in the absence of the chain transfer agent and ethylene-α-olefin copolymer is first isolated having a weight average molecular weight (Mw) within the range of greater than 200 kDa; followed by addition of the chain transfer agent and isolation of ethylene-α-olefin copolymer having a Mw of less than 400 kDa.

2. The process of claim 1, wherein the transition metal pyridyldiamide catalyst component is selected from compounds of the following structural formula:

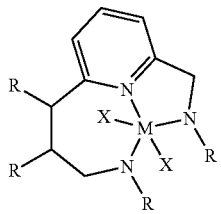

wherein M is a Group 4 transition metal, and each R group is selected independently from hydrogen or alkyls or aryls, and wherein any adjacent R groups may form an aliphatic or aromatic ring; and X is a halogen or alkyl.

3. The process of claim 1, wherein the transition metal pyridyldiamide catalyst component is selected from the following structural formula:

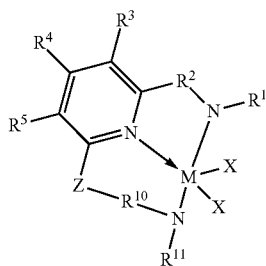

wherein M is a Group 4 transition metal;
$R^1$ and $R^{11}$ are independently selected from the group consisting of hydrocarbyls, substituted hydrocarbyls, heterohydrocarbyls, and silyl groups;
$R^2$ and $R^{10}$ are each, independently, divalent hydrocarbyls or aryls;
$R^3$, $R^4$, and $R^5$ are independently selected from the group consisting of hydrogen, hydrocarbyls, substituted hydrocarbyls, alkoxy, aryloxy, halogen, amino, and silyl, and wherein adjacent R groups may be joined to form a substituted or unsubstituted hydrocarbyl or heterocyclic ring, where the ring has 5, 6, 7, or 8 ring atoms and where substitutions on the ring can join to form additional rings;

X is an anionic leaving group, where the X groups may be the same or different and any two X groups may be linked to form a dianionic leaving group;

Z is $-(R^{14})_p QJ(R^{15})_q-$, wherein Q is carbon, oxygen, nitrogen, or silicon, and where J is carbon or silicon, p is 1 or 2; and q is 1 or 2; and $R^{14}$ and $R^{15}$ are independently selected from the group consisting of hydrogen, hydrocarbyls, and substituted hydrocarbyls, and wherein adjacent $R^{14}$ and $R^{15}$ groups may be joined to form an aromatic or saturated, substituted or unsubstituted hydrocarbyl ring, where the ring has 5, 6, 7, or 8 ring carbon atoms and where substitutions on the ring can join to form additional rings.

4. The process of claim 3, wherein $R^3$, $R^4$, and $R^5$ are independently selected from the group consisting of hydrogen, alkyls, aryls, and heteroaryls.

5. The process of claim 3, wherein $R^{14}$ and $R^{15}$ are independently selected from the group consisting of alkyls.

6. The process of claim 1, wherein the transition metal pyridyldiamide catalyst component is selected from the following structural formula:

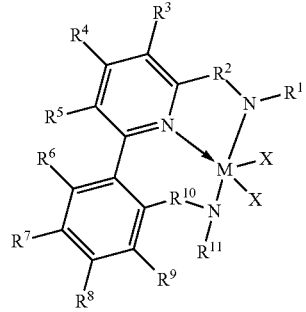

wherein M is a Group 4 transition metal;
$R^1$ and $R^{11}$ are independently selected from the group consisting of hydrocarbyls, substituted hydrocarbyls, heterohydrocarbyls, and silyl groups;
$R^2$ and $R^{10}$ are each, independently, divalent $C_1$ to $C_4$ hydrocarbyls or $C_5$ to $C_{12}$ aryls;
$R^3$, $R^4$, $R^5$, $R^6$, $R^7$, $R^8$, $R^9$, are independently selected from the group consisting of hydrogen, hydrocarbyls, substituted hydrocarbyls, alkoxy, aryloxy, halogen, amino, and silyl, and wherein adjacent R groups may be joined to form a substituted or unsubstituted hydrocarbyl or heterocyclic ring, where the ring has 5, 6, 7, or 8 ring atoms and where substitutions on the ring can join to form additional rings; and X is an anionic leaving group, where the X groups may be the same or different and any two X groups may be linked to form a dianionic leaving group.

7. The process of claim 6, wherein $R^3$, $R^4$, $R^5$, $R^6$, $R^7$, $R^8$, $R^9$, are independently selected from the group consisting of alkyls, aryls, and heteroaryls.

8. The process of claim 1, wherein the transition metal pyridyldiamide catalyst component is selected from compounds of the following structural formula:

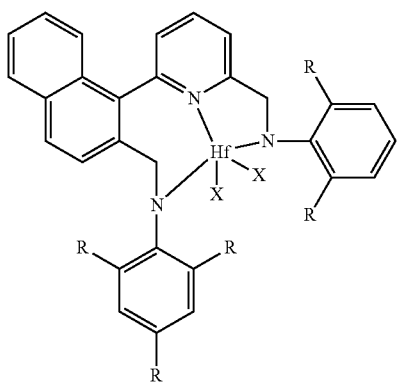

wherein each R group is selected from methyl, ethyl, propyl, isopropyl, isobutyl, or tert-butyl; and X is a halogen or alkyl.

9. The process of claim 1, wherein one transition metal pyridyldiamide catalyst component is used.

10. The process of claim 1, wherein the chain transfer agent is selected from Group 2, 12 or Group 13 alkyl or aryl compounds.

11. The process of claim 1, wherein the chain transfer agent is selected from diphenyl zinc or dialkyl zinc compounds, where the alkyl is selected independently from methyl, ethyl, propyl, butyl, isobutyl, tertbutyl, pentyl, hexyl, or cyclohexyl.

12. The process of claim 1, wherein the chain transfer agent is diethylzinc.

13. The process of claim 1, wherein the activator is a compound(s) distinguishable from the chain transfer agent.

14. The process of claim 1, wherein the activator is a compound(s) distinguishable from the chain transfer agent and the chain transfer agent is diphenylzinc or dialkylzinc.

15. The process of claim 1, further comprising scavenger, where the scavenger is not the same chemical compound as the chain transfer agent.

16. The process of claim 10, wherein the presence of the chain transfer agent increases the activity of the catalyst component by a factor of at least 2 relative to the activity under the same conditions when chain transfer agent is not present.

17. The process of claim 1, wherein the presence of the chain transfer agent increases the activity (g/mmol/h/bar) of the catalyst component by a factor of at least 3 relative to the activity under the same conditions when chain transfer agent is not present.

18. The process of claim 12, wherein the presence of the chain transfer agent increases the activity (g/mmol/h/bar) of the catalyst component by a factor of at least 5 relative to the activity under the same conditions when chain transfer agent is not present.

19. A process of producing ethylene α-olefin copolymers comprising:
  contacting ethylene and a $C_3$ to $C_{10}$ α-olefin with a transition metal pyridyldiamide catalyst component and an activator, as well as from 10 equivalents to 1000 equivalents relative to the catalyst component of chain transfer agent;
  isolating an ethylene-α-olefin copolymer having a $T_m$ of less than 140° C., a Mw/Mn of less than 2.5, and a weight average molecular weight (Mw) within the range of from 5 kDa to 500 kDa, wherein the contacting first takes place in the absence of the chain transfer agent and ethylene-α-olefin copolymer is first isolated having a Mw/Mn within the range of from 1.5 to 2.5; followed by addition of the chain transfer agent and isolation of ethylene-α-olefin copolymer having a Mw/Mn of less than 2.0.

20. The process of claim 19, wherein the transition metal pyridyldiamide catalyst component is selected from compounds of the following structural formula:

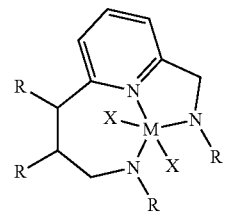

wherein M is a Group 4 transition metal, and each R group is selected independently from hydrogen or alkyls or aryls, and wherein any adjacent R groups may form an aliphatic or aromatic ring; and X is a halogen or alkyl.

21. The process of claim 19, wherein the transition metal pyridyldiamide catalyst component is selected from the following structural formula:

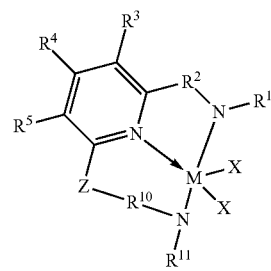

wherein M is a Group 4 transition metal;
$R^1$ and $R^{11}$ are independently selected from the group consisting of hydrocarbyls, substituted hydrocarbyls, heterohydrocarbyls, and silyl groups;
$R^2$ and $R^{10}$ are each, independently, divalent hydrocarbyls or aryls;
$R^3$, $R^4$, and $R^5$ are independently selected from the group consisting of hydrogen, hydrocarbyls, substituted hydrocarbyls, alkoxy, aryloxy, halogen, amino, and silyl, and wherein adjacent R groups may be joined to form a substituted or unsubstituted hydrocarbyl or heterocyclic ring, where the ring has 5, 6, 7, or 8 ring atoms and where substitutions on the ring can join to form additional rings;
X is an anionic leaving group, where the X groups may be the same or different and any two X groups may be linked to form a dianionic leaving group;
Z is $—(R^{14})_p\,QJ(R^{15})_q—$, wherein Q is carbon, oxygen, nitrogen, or silicon, and where J is carbon or silicon, p is 1 or 2; and q is 1 or 2; and $R^{14}$ and $R^{15}$ are independently selected from the group consisting of hydrogen, hydrocarbyls, and substituted hydrocarbyls, and wherein adjacent $R^{14}$ and $R^{15}$ groups may be joined to form an aromatic or saturated, substituted or unsubstituted hydrocarbyl ring, where the ring has 5, 6, 7, or 8 ring carbon atoms and where substitutions on the ring can join to form additional rings.

22. The process of claim 21, wherein $R^3$, $R^4$, and $R^5$ are independently selected from the group consisting of hydrogen, alkyls, aryls, and heteroaryls.

23. The process of claim 21, wherein $R^{14}$ and $R^{15}$ are independently selected from the group consisting of alkyls.

24. The process of claim 19, wherein the transition metal pyridyldiamide catalyst component is selected from the following structural formula:

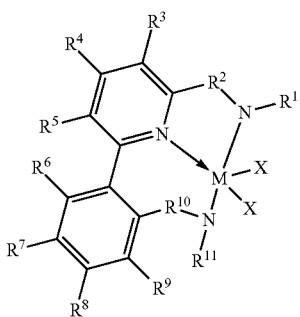

wherein M is a Group 4 transition metal;

$R^1$ and $R^{11}$ are independently selected from the group consisting of hydrocarbyls, substituted hydrocarbyls, heterohydrocarbyls, and silyl groups;

$R^2$ and $R^{10}$ are each, independently, divalent $C_1$ to $C_4$ hydrocarbyls or $C_5$ to $C_{12}$ aryls;

$R^3, R^4, R^5, R^6, R^7, R^8, R^9$, are independently selected from the group consisting of hydrogen, hydrocarbyls, substituted hydrocarbyls, alkoxy, aryloxy, halogen, amino, and silyl, and wherein adjacent R groups may be joined to form a substituted or unsubstituted hydrocarbyl or heterocyclic ring, where the ring has 5, 6, 7, or 8 ring atoms and where substitutions on the ring can join to form additional rings; and X is an anionic leaving group, where the X groups may be the same or different and any two X groups may be linked to form a dianionic leaving group.

25. The process of claim 24, wherein $R^3, R^4, R^5, R^6, R^7, R^8, R^9$, are independently selected from the group consisting of alkyls, aryls, and heteroaryls.

26. The process of claim 19, wherein the transition metal pyridyldiamide catalyst component is selected from compounds of the following structural formula:

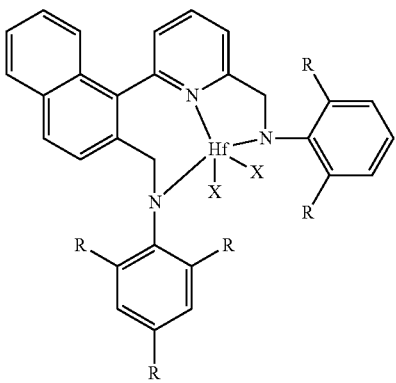

wherein each R group is selected from methyl, ethyl, propyl, isopropyl, isobutyl, or tert-butyl; and X is a halogen or alkyl.

27. The process of claim 19, wherein one transition metal pyridyldiamide catalyst component is used.

28. The process of claim 19, wherein the chain transfer agent is selected from Group 2, 12 or Group 13 alkyl or aryl compounds.

29. The process of claim 19, wherein the chain transfer agent is selected from diphenyl zinc or dialkyl zinc compounds, where the alkyl is selected independently from methyl, ethyl, propyl, butyl, isobutyl, tertbutyl, pentyl, hexyl, or cyclohexyl.

30. The process of claim 19, wherein the chain transfer agent is diethylzinc.

31. The process of claim 19, wherein the activator is a compound(s) distinguishable from the chain transfer agent.

32. The process of claim 19, wherein the activator is a compound(s) distinguishable from the chain transfer agent and the chain transfer agent is diphenylzinc or dialkylzinc.

33. The process of claim 19, further comprising scavenger, where the scavenger is not the same chemical compound as the chain transfer agent.

34. The process of claim 28, wherein the presence of the chain transfer agent increases the activity of the catalyst component by a factor of at least 2 relative to the activity under the same conditions when chain transfer agent is not present.

35. A process of producing ethylene α-olefin copolymers comprising:

contacting ethylene and a $C_3$ to $C_{10}$ α-olefin with a transition metal pyridyldiamide catalyst component and an activator, as well as from 10 equivalents to 1000 equivalents relative to the catalyst component of chain transfer agent;

wherein the contacting first takes place in the absence of the chain transfer agent and ethylene-α-olefin copolymer is first isolated having a weight average molecular weight (Mw) within the range of greater than 200 kDa; followed by addition of chain transfer agent and isolation of ethylene-α-olefin copolymer having a Mw of less than 400 kDa, or within a range of from 5 kDa to 200 kDa.

36. The process of claim 35, wherein the transition metal pyridyldiamide catalyst component is selected from compounds of the following structural formula:

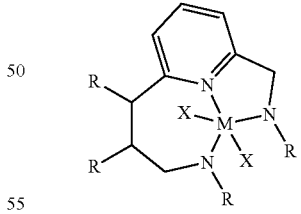

wherein M is a Group 4 transition metal, and each R group is selected independently from hydrogen or alkyls or aryls, and wherein any adjacent R groups may form an aliphatic or aromatic ring; and X is a halogen or alkyl.

37. The process of claim 35, wherein the transition metal pyridyldiamide catalyst component is selected from the following structural formula:

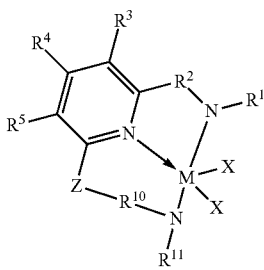

wherein M is a Group 4 transition metal;

$R^1$ and $R^{11}$ are independently selected from the group consisting of hydrocarbyls, substituted hydrocarbyls, heterohydrocarbyls, and silyl groups;

$R^2$ and $R^{10}$ are each, independently, divalent hydrocarbyls or aryls;

$R^3$, $R^4$, and $R^5$ are independently selected from the group consisting of hydrogen, hydrocarbyls, substituted hydrocarbyls, alkoxy, aryloxy, halogen, amino, and silyl, and wherein adjacent R groups may be joined to form a substituted or unsubstituted hydrocarbyl or heterocyclic ring, where the ring has 5, 6, 7, or 8 ring atoms and where substitutions on the ring can join to form additional rings;

X is an anionic leaving group, where the X groups may be the same or different and any two X groups may be linked to form a dianionic leaving group;

Z is $-(R^{14})_p QJ(R^{15})_q-$, wherein Q is carbon, oxygen, nitrogen, or silicon, and where J is carbon or silicon, p is 1 or 2; and q is 1 or 2; and $R^{14}$ and $R^{15}$ are independently selected from the group consisting of hydrogen, hydrocarbyls, and substituted hydrocarbyls, and wherein adjacent $R^{14}$ and $R^{15}$ groups may be joined to form an aromatic or saturated, substituted or unsubstituted hydrocarbyl ring, where the ring has 5, 6, 7, or 8 ring carbon atoms and where substitutions on the ring can join to form additional rings.

38. The process of claim 37, wherein $R^3$, $R^4$, and $R^5$ are independently selected from the group consisting of hydrogen, alkyls, aryls, and heteroaryls.

39. The process of claim 37, wherein $R^{14}$ and $R^{15}$ are independently selected from the group consisting of alkyls.

40. The process of claim 35, wherein the transition metal pyridyldiamide catalyst component is selected from the following structural formula:

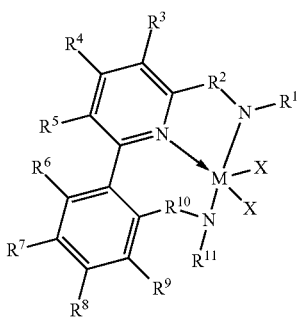

wherein M is a Group 4 transition metal;

$R^1$ and $R^{11}$ are independently selected from the group consisting of hydrocarbyls, substituted hydrocarbyls, heterohydrocarbyls, and silyl groups;

$R^2$ and $R^{10}$ are each, independently, divalent $C_1$ to $C_4$ hydrocarbyls or $C_5$ to $C_{12}$ aryls;

$R^3$, $R^4$, $R^5$, $R^6$, $R^7$, $R^8$, $R^9$, are independently selected from the group consisting of hydrogen, hydrocarbyls, substituted hydrocarbyls, alkoxy, aryloxy, halogen, amino, and silyl, and wherein adjacent R groups may be joined to form a substituted or unsubstituted hydrocarbyl or heterocyclic ring, where the ring has 5, 6, 7, or 8 ring atoms and where substitutions on the ring can join to form additional rings; and X is an anionic leaving group, where the X groups may be the same or different and any two X groups may be linked to form a dianionic leaving group.

41. The process of claim 40, wherein $R^3$, $R^4$, $R^5$, $R^6$, $R^7$, $R^8$, $R^9$, are independently selected from the group consisting of alkyls, aryls, and heteroaryls.

42. The process of claim 35, wherein one transition metal pyridyldiamide catalyst component is used.

43. The process of claim 35, wherein the chain transfer agent is selected from Group 2, 12 or Group 13 alkyl or aryl compounds.

44. The process of claim 35, wherein the chain transfer agent is selected from dialkyl zinc compounds, where the alkyl is selected independently from methyl, ethyl, propyl, butyl, isobutyl, tertbutyl, pentyl, hexyl, or cyclohexyl.

45. The process of claim 35, wherein the chain transfer agent is diethylzinc.

46. The process of claim 35, wherein the chain transfer agent is diphenyl zinc.

47. The process of claim 35, wherein the activator is a compound(s) distinguishable from the chain transfer agent.

48. The process of claim 35, further comprising scavenger, where the scavenger is not the same chemical compound as the chain transfer agent.

49. The process of claim 48, where the scavenger is tri-n-octylaluminum.

50. The process of claim 49, wherein the chain transfer agent is diethylzinc.

51. The process of claim 35, further comprising scavenger, where the scavenger is not the same chemical compound as the chain transfer agent and the chain transfer agent is diethylzinc.

52. The process of claim 35, wherein the presence of the chain transfer agent increases the activity of the catalyst component by a factor of at least 2 relative to the activity under the same conditions when the chain transfer agent is not present.

53. The process of claim 35, wherein the presence of the chain transfer agent increases the activity of the catalyst component by a factor of at least 4 relative to the activity under the same conditions when chain transfer agent is not present.

54. A process of producing ethylene α-olefin copolymers comprising:

contacting ethylene and a $C_3$ to $C_{10}$ α-olefin with a transition metal pyridyldiamide catalyst component and an activator, as well as from 10 equivalents to 1000 equivalents relative to the catalyst component of chain transfer agent;

wherein the contacting first takes place in the absence of chain transfer agent and ethylene-α-olefin copolymer is first isolated having a Mw/Mn within the range of from 1.5 to 2.5; followed by addition of the chain transfer agent and isolation of ethylene-α-olefin copolymer having a Mw/Mn of less than 2.0.

55. The process of claim 54, wherein the transition metal pyridyldiamide catalyst component is selected from compounds of the following structural formula:

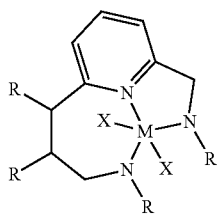

wherein M is a Group 4 transition metal, and each R group is selected independently from hydrogen or alkyls or aryls, and wherein any adjacent R groups may form an aliphatic or aromatic ring; and X is a halogen or alkyl.

56. The process of claim 54, wherein the transition metal pyridyldiamide catalyst component is selected from compounds of the following structural formula:

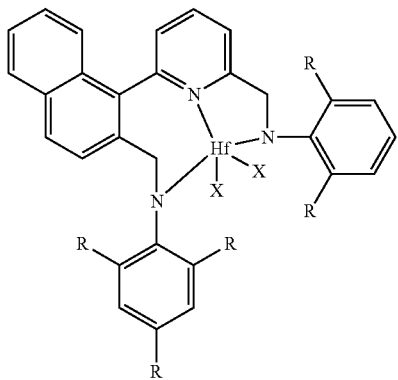

wherein each R group is selected from methyl, ethyl, propyl, isopropyl, isobutyl, or tert-butyl; and X is a halogen or alkyl.

57. The process of claim 54, wherein one transition metal pyridyldiamide catalyst component is used.

58. The process of claim 54, wherein the chain transfer agent is selected from Group 2, 12 or Group 13 alkyl or aryl compounds.

59. The process of claim 54, wherein the chain transfer agent is diethylzinc.

60. The process of claim 54, further comprising scavenger, where the scavenger is not the same chemical compound as the chain transfer agent.

61. The process of claim 60, where the scavenger is tri-n-octylaluminum.

62. The process of claim 54, wherein the presence of the chain transfer agent increases the activity of the catalyst component by a factor of at least 2 relative to the activity under the same conditions when the chain transfer agent is not present.

63. A process of producing ethylene α-olefin copolymers comprising:
    contacting ethylene and a $C_3$ to $C_{10}$ α-olefin with a transition metal pyridyldiamide catalyst component and an activator, as well as from 10 equivalents to 1000 equivalents relative to the catalyst component of diphenyl zinc chain transfer agent; isolating an ethylene-α-olefin copolymer having a $T_m$ of less than 140° C., a Mw/Mn of less than 2.5, and a weight average molecular weight (Mw) within the range of from 5 kDa to 500 kDa, wherein the presence of the chain transfer agent increases the activity of the catalyst component by a factor of at least 2 relative to the activity under the same conditions when chain transfer agent is not present.

64. The process of claim 63, wherein one transition metal pyridyldiamide catalyst component is used.

\* \* \* \* \*